United States Patent [19]
Moore et al.

[11] Patent Number: 6,118,490
[45] Date of Patent: Sep. 12, 2000

[54] DISPLAY BASED OPTICAL COMMUNICATION SYSTEM

[75] Inventors: Kevin B. Moore, Chaska; Robert C. Voss, Lakeville; Michael F. Meyer, Ramsey, all of Minn.

[73] Assignee: Interactive Learning Group, Inc., Bloomington, Minn.

[21] Appl. No.: 08/847,100

[22] Filed: May 1, 1997

[51] Int. Cl.⁷ .................................................. H04N 7/08
[52] U.S. Cl. .................................... 348/473; 348/553
[58] Field of Search ................................ 348/473, 476, 348/478, 465, 468, 553, 552, 189, 12, 13

[56] References Cited

U.S. PATENT DOCUMENTS

| | | | |
|---|---|---|---|
| 3,993,861 | 11/1976 | Baer | 178/5.6 |
| 4,186,413 | 1/1980 | Mortimer | 358/146 |
| 4,206,557 | 6/1980 | Swinton | 35/9 B |
| 4,329,684 | 5/1982 | Monteath et al. | 340/707 |
| 4,613,904 | 9/1986 | Lurie | 358/142 |
| 4,807,031 | 2/1989 | Broughton et al. | 348/473 |
| 4,817,204 | 3/1989 | Jannelli et al. | 455/607 |
| 4,835,609 | 5/1989 | Uemura et al. | 358/142 |
| 5,040,242 | 8/1991 | Tsuchiya et al. | 359/154 |
| 5,087,982 | 2/1992 | Smothers | 359/137 |
| 5,315,645 | 5/1994 | Matheny | 379/144 |
| 5,557,334 | 9/1996 | Legate | 348/473 |
| 5,585,816 | 12/1996 | Scheffer et al. | 345/100 |
| 5,594,493 | 1/1997 | Nemirofsky | 348/13 |
| 5,663,766 | 9/1997 | Sizer, II | 348/473 |
| 5,734,423 | 3/1998 | Wakabayashi | 348/189 |

*Primary Examiner*—Victor R. Kostak
*Attorney, Agent, or Firm*—Kiney & Lange, P.A.

[57] ABSTRACT

A communication system for transmitting information by digital binary signaling over an optical channel as a series of light pulses each beginning with a minimum duration and thereafter being variable to represent different binary states. Transmission is between an optical transmitter based on a portion of a display screen in a display device and a photodetector in a signal processing system. Information is recovered by finding averaged sample values, and is evaluated by comparing it against an accumulated averaged sample based threshold derived from the optical signal at a selected intensity. The information received can be used to verify user inputs to the signal processing system.

28 Claims, 7 Drawing Sheets

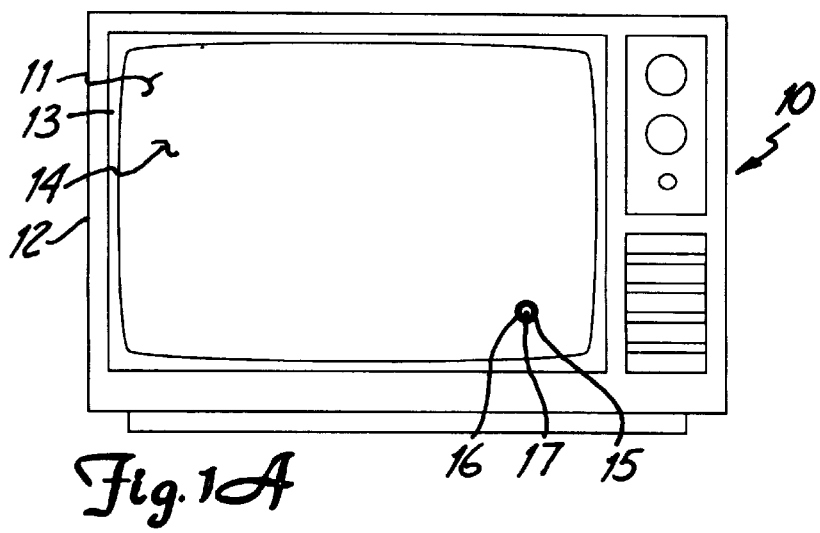
Fig. 1A
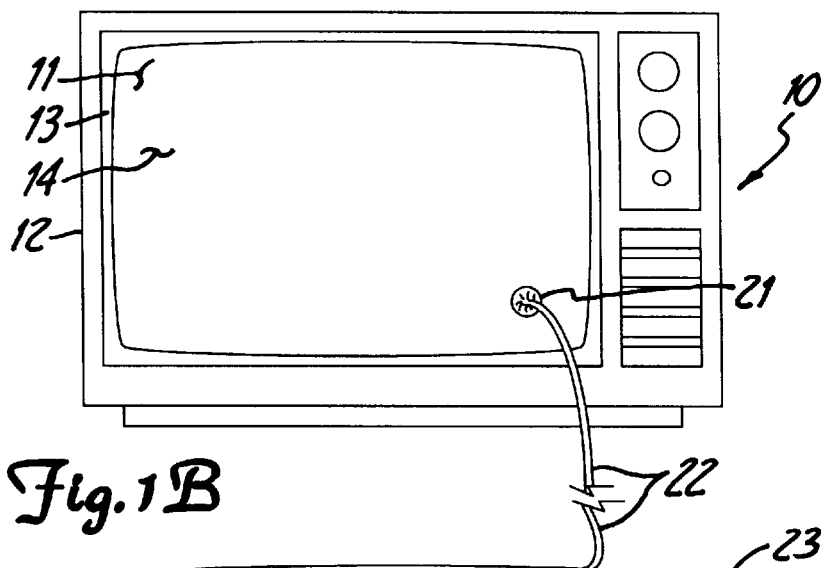
Fig. 1B
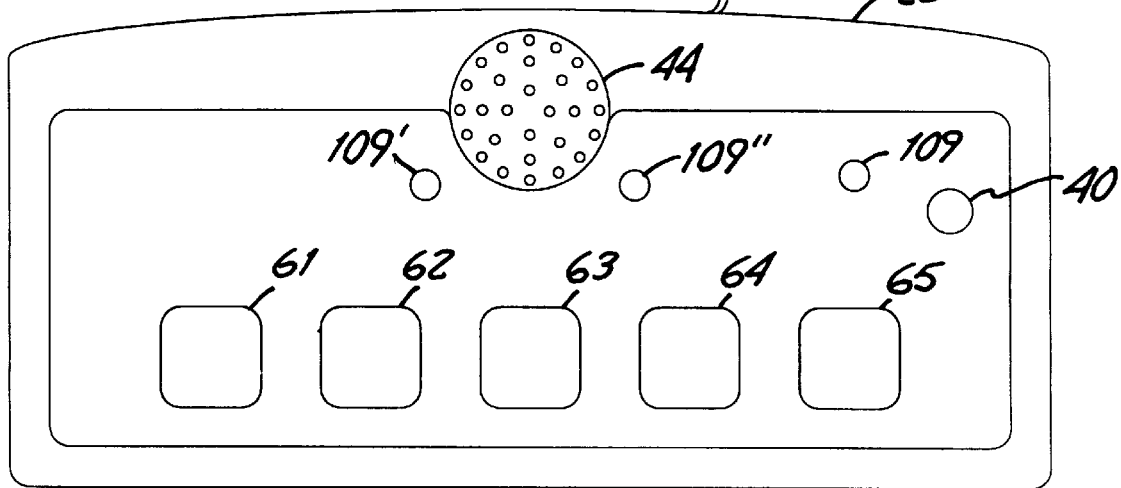

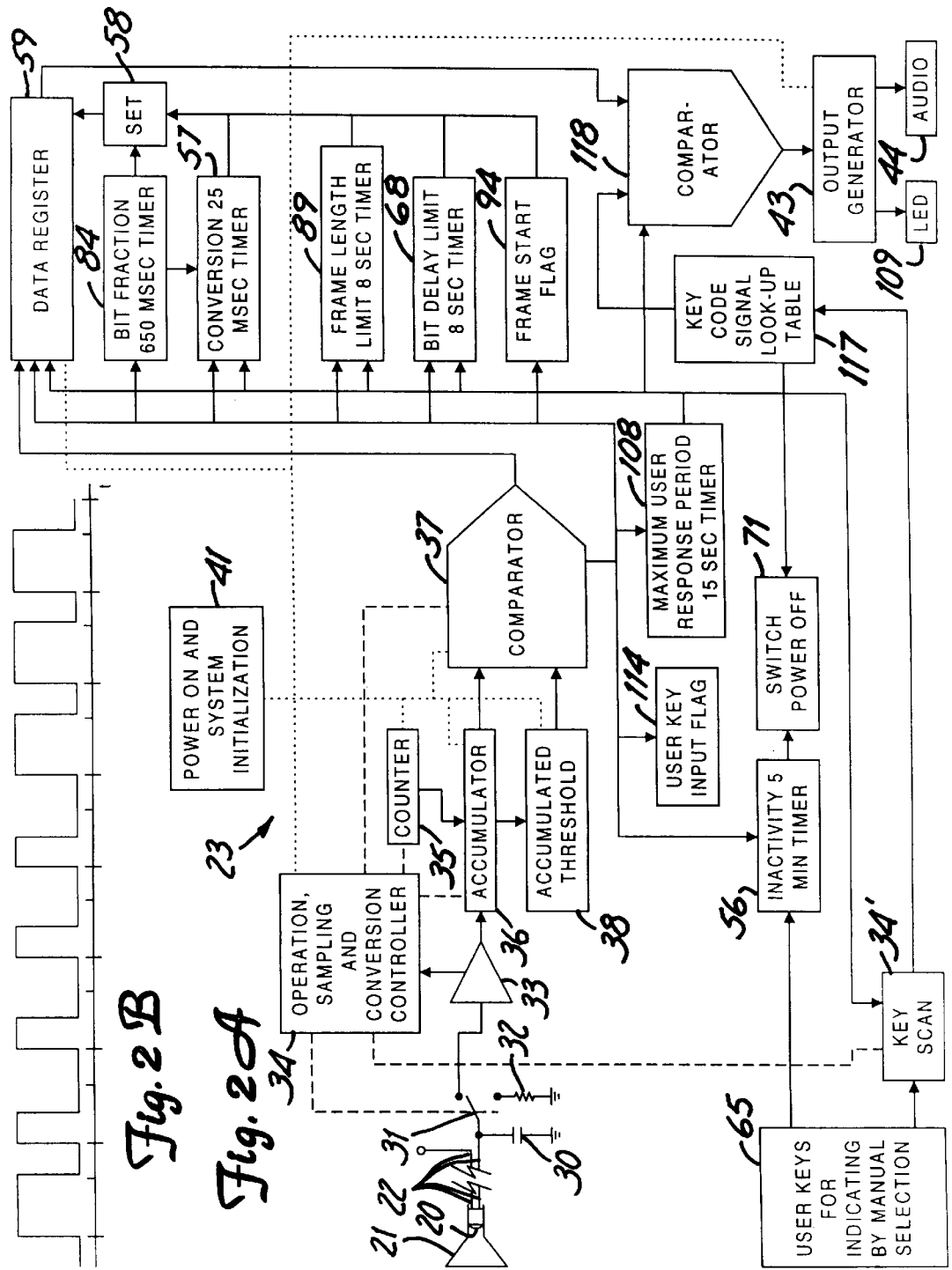

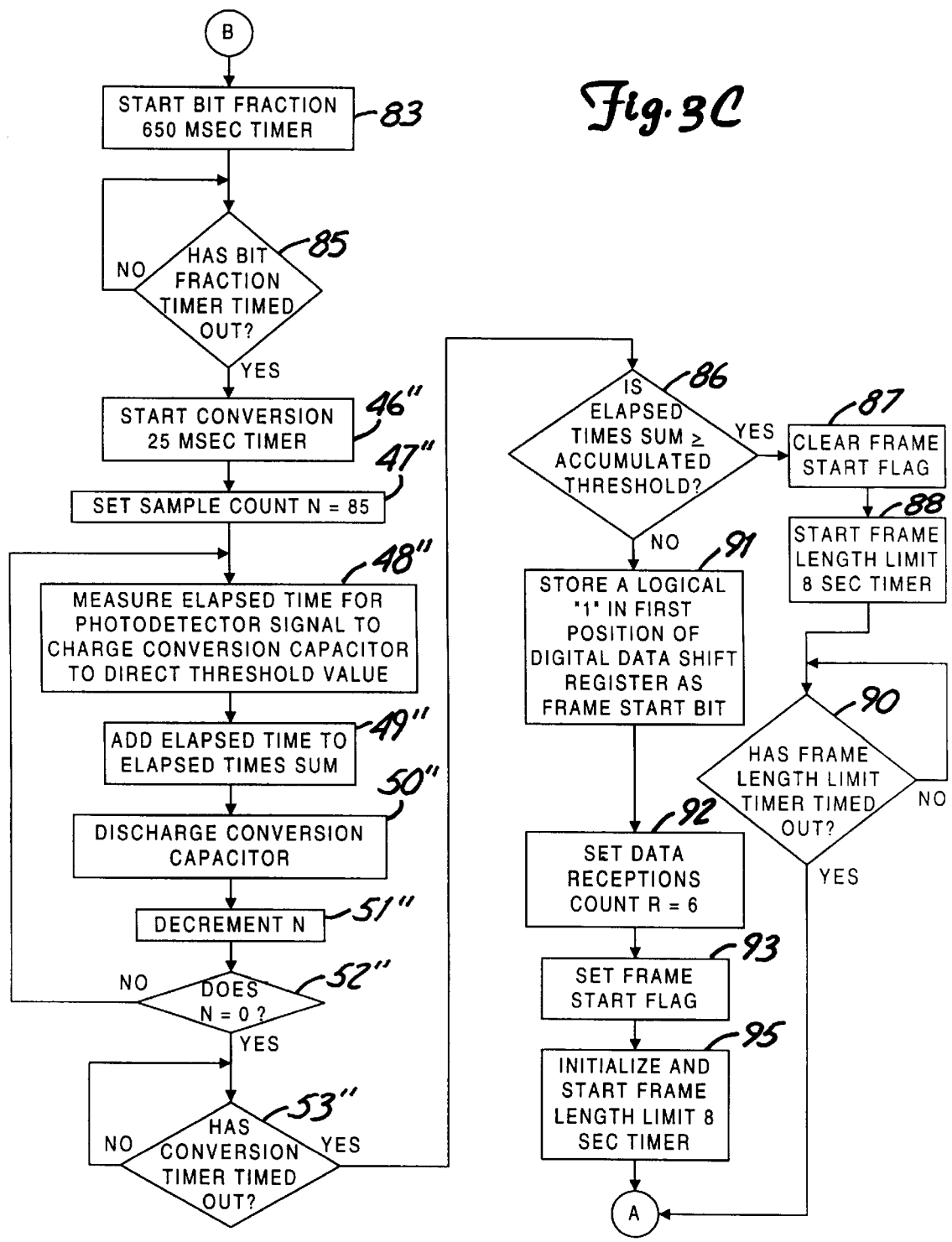

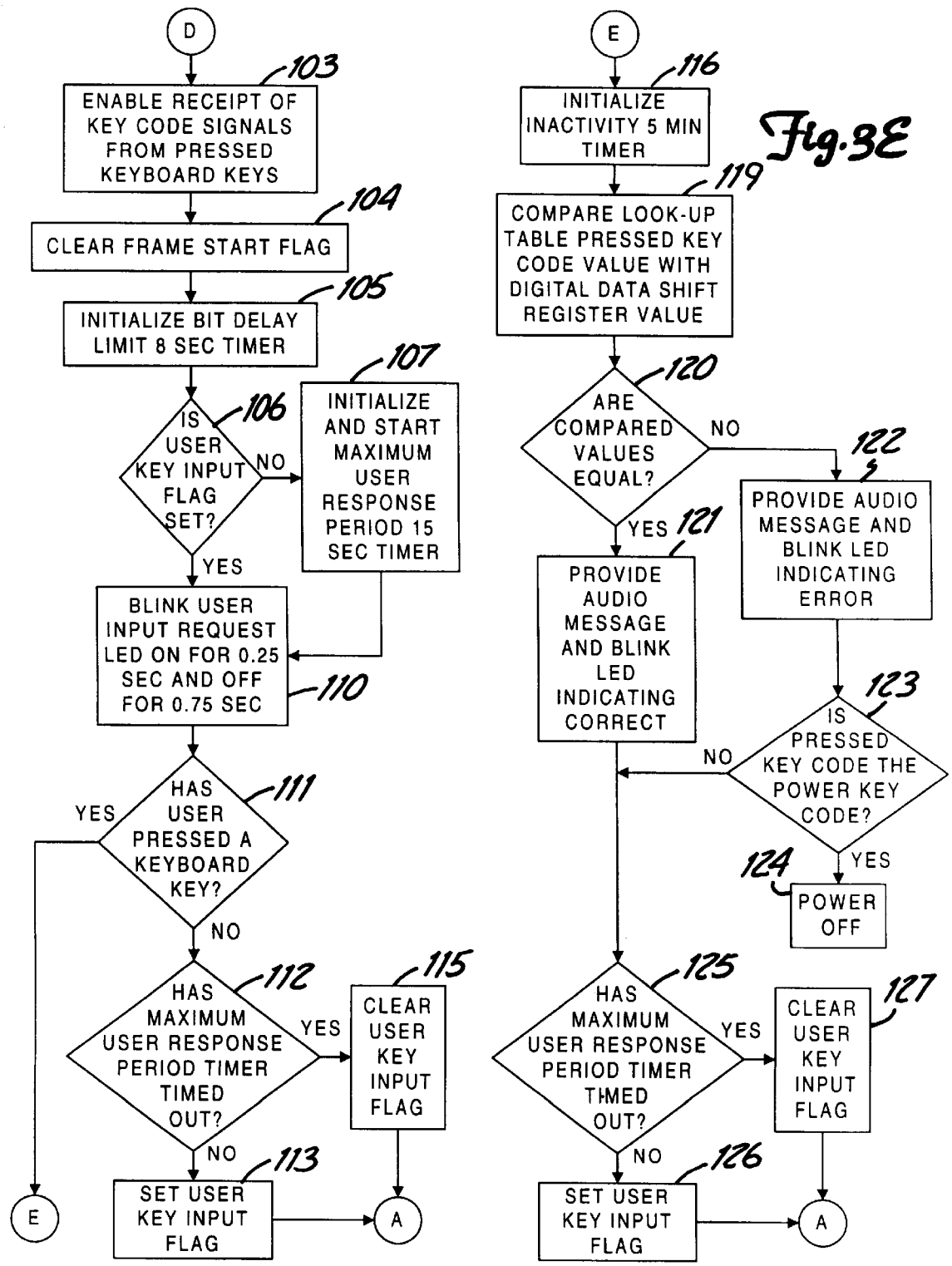

DISPLAY BASED OPTICAL COMMUNICATION SYSTEM

BACKGROUND OF THE INVENTION

The present invention relates to short transmission distance optical communication systems and, more particularly, to such systems based on using a portion of a visual display as the transmitter in such a system.

Television receivers and computers have become ubiquitous, and are found in homes, offices, etc. Both the television receiver and the display monitor used in connection with computers provide visual displays for the benefit of users. Such users typically have a substantial capability to control what is displayed on the screen of a computer display monitor to the point of interacting with that display to control modifications thereof. Television users, on the other hand, are usually restricted insofar as the display presented on the screen of a television receiver to just that which is shown as the result of a channel selection or of a video tape selected for use in a video tape recorder connected to supply video signals to the television receiver.

Nationally determined broadcasting standards and economics have limited the opportunities to provide significant numbers of television receivers with broader capabilities. There have, however, been some added capabilities provided to some television receivers insofar as adding supplemental signals for transmission along with the usual video display control signals to thereby provide additional information to viewers or users which can be used for various purposes. One such system is the transmission of digital information in these supplemental signals provided during blanking periods in the usually transmitted video display control signals that control the displays used in presenting ordinary programming on the screen of the television receiver. Such signals have been used to provide television schedules, stock quotes, etc. The system can be interactive if the television receiver is connected to a two-way cable system, the telephone system, or in some other two-way transmission arrangements. However, such systems are often impractical for home use because of cost, scheduling limits, technical complexity and the like.

A further method of transmitting supplementary signals which ameliorates some of these difficulties is one using a portion of the display screen of a television receiver as an optical signal transmitter. Video display control signals from a television camera, or from a video tape recorder, or from some other source controlling the visual images displayed on the screen of a television receiver picture tube are used in the conventional manner to provide the primary visual images on that display screen in all but a selected small portion thereof. In this selected portion, however, a digital optical signal is generated so as to convert that portion of the display screen into serving as a transmitter of such an optical signal. The receiver of this optical signal comprises an optical signal processing system, including a photodetector mountable across from this optical transmitter portion of the display screen to effectively form an optical signal channel therebetween. Once the optical signal generated by the optical transmitter portion of the display screen is through the channel to impinge on the photodetector, that photodetector converts the optical signal to a corresponding electrical signal which can be used as appropriate in the remainder of the signal processor typically in connection with the visual images provided on the television display screen.

The baseband optical signal provided at the transmitter portion of the television receiver display screen is baseband modulated in some manner to carry with it the digital information intended to be transmitted from a data source or sources, controlling the formation of the video display control signals in the television receiver, to the remainder of the signal processor connected to the photodetector that is to make use of such information. Once such modulation technique known is to have a relatively large intensity light level in the transmitter display screen portion represent one logic state in a binary logic system, and have a relatively small light intensity in that portion represent the remaining logic level state in such a system. Other known possibilities are varying the amplitude of the light in the transmitting location between other, different levels of intensity or color to represent binary logic states, having more than one screen display transmitting portion so that the different positions among them exhibiting a substantial light intensity could represent these logic states, or some variations in frequency of the occurrence of substantial intensity pulses could be used for this purpose. However, each of these methods is susceptible to the introduction of transmitted data error because of the nature of the environment in which the optical signal is generated and the deficiencies in television signals and screen displays.

A first concern is the reflection of light, originating externally to the transmitter display screen portion, being directed into that portion to reflect therefrom or from the cabinet window surfaces into the photodetector. Another concern is the occurrence of "ghost" images on the television display screen offset somewhat from one another which arise because of the television signals propagating over multiple paths to the television receiving antenna. In addition, images formed on the television display screen suffer from position jitter as well as from noise arising from a variety of sources. Further, television receivers age so that a wide range of television tube conditions can be encountered over a variety of television receivers.

Such occurrences and deficiencies in the electromagnetic radiation reaching the photodetector often lead to corresponding erroneous electrical output signals from that photodetector. These output signals are then applied to a magnitude based signal detector that correspondingly detects these occurrences as erroneous digital data values. Many of the methods that might otherwise be suitable to reduce the problems leading to these errors are costly, complicated or bulky or all of these. Thus, there is desired a system for transmitting information from a portion of a visual display over an optical channel to a detecting device which more reliably acquires the data intended to be sent while using a relatively inexpensive system.

SUMMARY OF THE INVENTION

The present invention provides a communication system for transmitting information by digital binary signaling over an optical channel using, as an optical transmitter, a selected portion of a visual display screen, such as in a television or computer monitor, to provide sequences of light pulses in the channel as an optical signal. The durations of these light pulses are used to represent binary logic states in accord with digital data provided to the optical transmitter from a data source thereby forming a binary pulse duration modulated optical signal. The light pulses in this arrangement each have a minimum duration of relatively higher optical intensity after such pulse begins before the duration becomes indicative of the binary state represented. A photodetector is positioned across from the visual display screen portion serving as the optical transmitter to receive the optical signal from the optical channel and provide, with suitable biasing electrical output signals corresponding to the incoming optical signals impinging thereon. A cadmium sulfide photoconductor can be used.

A signal processor connected to the photodetector determines substantially when individual light pulses begin and end relative to neighboring said light pulses in sequences thereof without use of a transmitted pulse timing recovery system. This is accomplished through averaging numerous individual samples taken of the photodetector output signal representing the optical signal at each sampling time to obtain an averaged sample, and doing so repeatedly to seek pulse leading edges followed by a further averaged sample to establish the binary logic state represented by the corresponding pulse. A threshold value to be used for categorizing other averaged samples can be based on a modified averaged sample taken when the optical signal is at a selected intensity.

The information represented in the light pulses is typically transmitted to correspond with other visual images of the screen and, in one example, this information can be used to check on a user's response to such other visual images as provided by that user through an input device such as a keyboard. The user's time to respond to the visual images can be selected by the data source, at least up to some duration limit, and the user can be given opportunity to reselect a response if desired.

BRIEF DESCRIPTION OF THE DRAWINGS

FIGS. 1A and 1B show portions of the system embodying the present invention,

FIGS. 2A and 2B show a mixed component and function block diagram of a part of the system portion shown in FIG. 1 and a waveform representing a signal of a kind occurring therein during operation, and FIGS. 3A, 3B, 3C, 3D and 3E show flow chart portions representing operation of the system shown in FIG. 2A.

DETAILED DESCRIPTION OF THE PREFERRED EMBODIMENTS

Figure 3A:
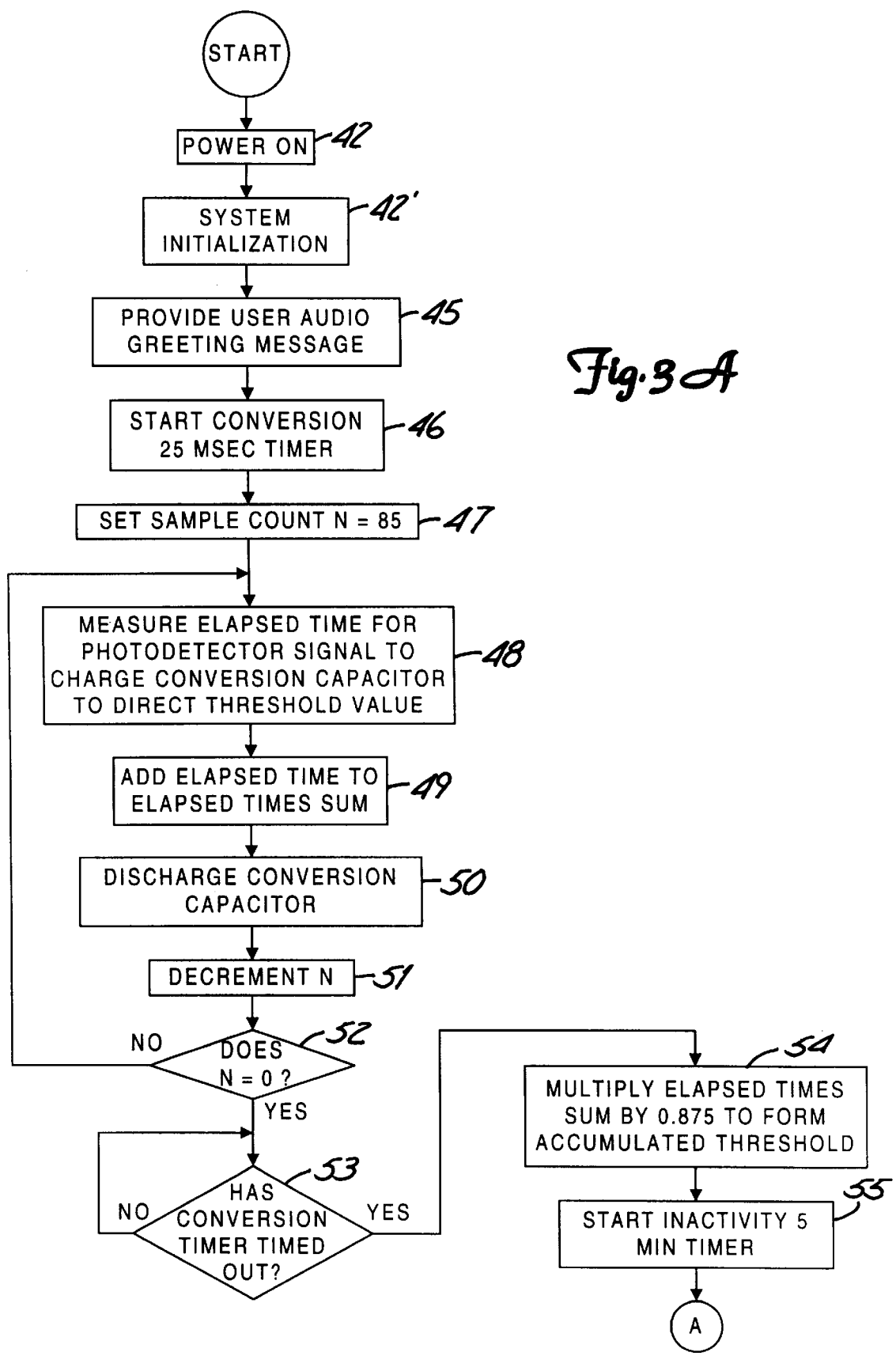

FIG. 1A shows a conventional television receiver, 10, having a protective window, 11, set in a cabinet, 12, covering a mask, 13, about a screen, 14, of a picture tube or cathode ray tube which is also covered thereby. Screen 14 is the visual image display surface of the picture tube in television 10 in the ordinary manner. Controls and speakers and the like are shown on the right-hand side of cabinet 12.

Television receiver 10 is assumed to be displaying primary visual images on screen 14 (which are not shown in FIGS. 1A and 1B but usually cover the entire visible screen) in accord with the video display control signals provided by some data source such as a broadcast transmitter or a video tape recorder or the like. These primary visual images are displayed over most or all of screen 14 other than in a optical transmitter display screen portion, 15, of screen 14 in the form of a circular disk that is devoted to serving as an optical signal transmitting portion of that screen based on corresponding images formed in this portion.

Optical transmitter display screen portion 15 has an outer extent set by the outer periphery of a darkened annular ring display screen portion, 16, which surrounds an optical signal generating core display screen portion, 17, shown as radiating a relatively high intensity electromagnetic radiation in FIG. 1A in the visible spectrum by being shown in white. In the opposite condition of radiating relatively low intensity electromagnetic radiation in the visible spectrum, optical signal generating core portion 17 would be shown darkened approximately the same as annular ring 16. However, even in a darkened condition, core display screen portion 17 and annular ring 16 both radiate a significant amount of light having a broad band spectral content in a conventional television.

The use of annular ring portion 16 in a constantly darkened condition provides assistance in positioning a photodetector, 20, shown in the mixed component and function block diagram of FIG. 2A, across from optical transmitter display screen portion 15 of screen 14 to form an optical communications channel therebetween. Photodetector 20 is mounted on protective glass 11 across from display screen portion 15 to complete the optical channel by using a suction cup, 21, shown in both FIGS. 1B and 2A, in which it is housed. Suction cup 21 is formed from opaque, flexible polymeric material as a circular tubular portion in which photodetector 20 is positioned that intersects a cone portion extending outward from this tube portion in front of the photodetector that ends at an outer circular edge. In providing this aid, annular ring 16 has an outer diameter chosen to be slightly larger than the diameter of the outer edge periphery of suction cup 21 to ease the centering of that suction cup over display screen portion 15 before pushing it against glass 11 for mounting same because of the guidance the exposed edges of annular ring 16 provide with respect to the edges of that cup.

In addition, annular ring 16 serves as sort of a guard band in helping to prevent light originating outside of core display screen portion 17 from being refracted or reflected into photodetector 20 in suction cup 21. Photodetector 20 is mounted rearward in the tube portion of suction cup 21 from the intersection of that portion with the cone portion thereof to further reduce the possibilities of such reflected or refracted outside light reaching that photodetector, typically by a small fraction of an inch. After the optical signal from core display screen portion 17 is received by photodetector 20 and converted into a corresponding electrical current serving as the photodetector output signal, that current is passed through a pair of leads, 22, connected to photodetector 20 and the remainder of a signal processing and selection system, 23, shown in FIGS. 1B and 2A.

As can be seen, transmitter display screen portion 15 has been chosen to be located toward the lower right-hand corner of tube screen 14. This, of course, keeps transmitting display screen portion relatively far from the location of primary image activity 14, typically occurring around the center of that screen, to avoid obscuring that primary image activity being presented on the screen. This is true whether photodetector 20 and suction cup 21 are being used with transmitter display screen portion 15, thus adding their obscuration to reduce the quality of viewing, or not being used which leaves just transmitter display screen portion 15 to obscure the view. However, transmitter display screen portion 15 must be located sufficiently far from the edges of mask 13 to prevent the edges of suction cup 21 from not being on protective glass 11 in being centered over transmitter display screen portion 15.

As indicated, the varying image of transmitter display screen portion 15 on screen 14 having relatively constant, low intensity annular ring 16 surrounding optical signal generating core display screen portion 17 with its varying intensity can be provided in various ways. One way is by recording suitable versions of these images as selected on successive frames in video tapes that are played back through a video tape recorder controlling the video signals developed for controlling the visual images displayed on screen 14. Alternatively, the image of transmitting display screen portion 15 can be provided for in the signals carrying direct broadcasts of signals for controlling visual images to be displayed on screen 14 in television 10. A further alternative is to record such broadcast signals and thereafter add suitable signals thereto so that the image of transmitter display screen portion 15 appears on screen 14 in the subsequent use of these stored and modified signals used to control the video signal controlling in turn the visual images provided on screen 14. In all of these situations, typically, a primary set of visual images is displayed over all of screen 14 except within transmitter display screen portion 15. In many instances, there will be coordination between the primary visual images displayed on screen 14 and the optical signal developed in transmitting display screen portion 15. As one example, one which will be developed further below, a question may appear for instance in the primary visual images with the answer thereto provided in the optical signal generated in core display screen portion 17 of transmitter display screen portion 15.

In the situation where television 10 is a color television, the color of the optical signal developed in optical signal generating core display screen portion 17 must be chosen, a choice which is based on determining those color differences which might be most distinguishable to the photodetector used. As in the system described above, the high intensity white color signal can be chosen to represent one logic state and the low intensity black color signal the other. On the other hand, a relatively high intensity red could be chosen to represent one logic state and a high intensity green could be chosen to represent the other logic state in a binary logic system if the photodetector used provide greater electrical output signal difference for red and green light impinging thereon as opposed to black and white light impinging thereon.

As will be described below, the photodetector chosen is a cadmium sulfide photoconductor because of the low cost of such photodetectors. This type of photodetector is sensitive to a wide range of color with the greatest sensitivity typically occurring in the red portion of the visual spectrum.

The possibility of choosing different colors to signify different logic states in the optical generating core display screen portion 17 is a choice that suffers from the shortcomings of television picture tubes. Such picture tubes do not have either stable or monotonic colored optical signal outputs for given video signal inputs. Thus, such limitations suggest that the output signal should rely primarily on the luminance component of the signal and with relatively little reliance on the chrominance components of the signal. Hence, white and black are chosen as the colors to be used to represent the two alternative logic states in the binary logic system based optical signal to be generated at core display screen portion 17. The color white in the optical signal has the highest broad band spectral content and the highest luminance component in being formed by the sum of the red, blue and green light components available. In contrast, the color black has the lowest spectral content and the least luminance component in being formed by substantially the absence of such light components.

Another reason for choosing black and white as the colors to be used in generating the optical signal from core display screen portion 17 is its location toward the edge of the screen rather than at the center thereof. Severe color distortions can occur near the edge of the screen that do not occur toward the center. These distortions will have less effect on the white and black colors since, in additive color theory, white is the sum of the colors present and black is the absence thereof thus tending to balance out in each the occurrences of color distortions.

The contrast in the optical signal between the colors black and white must be sufficient to allow the photodetection system to distinguish between them. This may require adjusting the brightness to be adequate in the television receiver used, and the adjusting of the contrast to be adequate for this purpose.

A cadmium sulfide photoconductor exhibits a low-pass frequency response due to physical processes involving the charge carriers therein which yield a cutoff frequency of from 300 to 1000 Hz. Such a limitation in frequency response limits the bit rate at which pulses representing bits of information can be transmitted from optical signal generating core display screen portion 17 through photodetector 20 to signal processing and selection system 23. Other limits on the data rate are the stability of the optical signal developed in core display screen portion 17 in that the display for a bit must remain sufficiently long so that fluctuations therein due to the problems described above will not be erroneously detected as information bits. Of course, the greater the difference between the colors white and black representing the alternative logic states in a binary system, the less of a problem such fluctuations will be. Furthermore, the quality of the signal processing system following the photodetector will also affect the allowed data rate or bit rate for the optical signal generated in core screen display portion 17.

An example of a portion of the optical signal generated in core screen display portion 17 is shown in FIG. 2B. Thus, the magnitude of the waveform in a vertical direction FIG. 2B represents optical intensity along a magnitude axis not shown, and the waveform is shown extending horizontally as a function of time. The waveform portion shown is that for one data packet formed by a series of eight successive pulses each having one of two alternative magnitude values at any point therein with these pulses occurring periodically along the time line, the eight pulses shown constituting one packet or frame of information pulses. The pulse periods are represented by vertical tick lines on the time line which extend both above and below the time line, each indicating the end of one pulse and the beginning of the next. Each such pulse in the waveform represents one binary logic system bit of information so that each packet contains eight bits of information in the eight bit pulses therein.

The waveform of FIG. 2B also represents essentially the waveform of the output current of photodetector 20 after conversion therein of the incoming optical signal to such an output electrical signal by the transducing behavior of that photodetector. This waveform, in the photodetector output signal situation, plots along the vertical (unseen) axis the current magnitude with the current pulses again extending horizontally along the time axis with each current pulse again representing one bit of information in the binary logic system. Hence, an optical signal data packet converted by photodetector 20 to an output current data packet supplies eight bits of binary information to signal processing and selection system 23 to which photodetector 20 is connected through leads 22.

The bit rate, or data rate, occurring for the waveform of FIG. 2B is set by the number of pulses therein which occurred during a unit of time. This bit rate or data rate is limited, as indicated above, by the response characteristics of the communication system of FIG. 1B to pulses in the various forms propagating therethrough. Even with such an upper limit on the possible bit rate or data rate in the system, a significant range of alternative rates is available. In the example of use of the system to be described here, there is not a need for a fast data rate, and so the pulse duration chosen in FIG. 2B for use with the system shown in FIGS. 1B and 2A is one pulse per second giving a bit rate of one bit per second.

The waveform in FIG. 2B also shows the baseband modulation to form this baseband signal that is transmitted from the core display screen portion 17 through the optical channel to photodetector 20 and on to system 23, this modulation providing the baseband signal having therein pulses with either of two alternative pulse widths, or pulse durations, to represent one or the other of the two binary logic states represented by each pulse.

In the present example, each pulse has a minimum duration of a relatively high optical intensity magnitude lasting one-third of a second. If the pulse terminates at that point in its period by the optical intensity dropping from this relatively high intensity value to a relatively low intensity value, the pulse represents a logical "0". If, in the alternative, the pulse continues to exhibit a relatively high optical intensity magnitude for a further third of the second so as to exhibit this higher intensity for two-thirds of a second, i.e. two-thirds of a pulse period, the pulse is taken to represent a logical "1".

Thus, the first and earliest pulse on the left in FIG. 2B represents a binary logic "1" which is followed four successive pulses each representing a binary logic "0". Finally, the packet is completed by three successive pulses each representing a binary logic "1".

The conventional rate that successive visual image display frames are successively displayed on the screen of a television set is typically thirty frames per second. Thus, core display screen portion 17 will always radiate at a relatively high optical intensity magnitude for the first one-third of a second, or the first one-third of a pulse period, for each bit pulse in the optical signal such as those in the waveform example shown in FIG. 2B, that is, core display screen portion 17 will radiate with a high optical intensity for the first ten frames occurring in any pulse period. The optical intensity present during the remainder of a pulse period depends on whether the corresponding bit pulse is to represent a logical "0" or a "1". In the situation of the bit pulse representing a "0", the optical intensity magnitude after the first third of a second drops to a relatively low value for the remaining two-thirds of a second in the pulse period, i.e. the optical intensity radiated at core display screen portion 17 during the last twenty frames in such a pulse period is at a relatively low value. On the other hand, in the instance of a bit pulse representing a logic "1", the optical intensity magnitude in core display screen portion 17 remains at a relatively high value for the next one-third of a second or pulse period, i.e. the second ten frames of a pulse period, and then drops to a relatively low value. Thus, the optical intensity magnitude in core screen display portion 17 is at a relatively low value during just the last ten frames in a pulse period for a bit pulse representing a logical "1".

There are certain standard characteristics used in delineating each packet in the sequence of such packets forming the optical signal generated at core display screen portion 17. The first bit pulse, or "start bit", in a packet is always a bit pulse representing a logic value of "1", and the last pulse in the packet, or the "end bit", is also always a bit pulse representing a logic value of "1". The six bit pulses therebetween are data pulses representing a value in the binary number system with the first pulse following the start bit always representing the most significant bit in the binary number, and the last bit prior to the end bit always representing the least significant bit in that binary number. In the present example, only eight different binary numbers at most are needed so that the three most significant bit pulses are always pulses representing logic value "0". The three least significant data bit pulses thus are used to represent at most eight different binary numbers and, in fact, fewer than eight are actually used in the present example. Nevertheless, the number of data bits available allows significantly more alternatives than actually being used to be sent by the data source controlling the formation of the optical signal at core display screen portion 17.

As can be seen in the waveform example in FIG. 2B, a bit pulse in the final third of its pulse period, or final third of a second of its one second period, always has a relatively low optical intensity magnitude value. In addition, the next following bit pulse always begins the first third of its pulse period at a relatively high optical intensity magnitude value before the alternative variations in optical intensity in the middle third of the pulse occur to indicate that the pulse represents either a logical value "0" or a logical value "1". This modulation arrangement allows recovering the information in the optical signal by the signal processing system without the need to establish the timing base used in transmitting the optical signal and the corresponding cost and complexity increase in the circuitry in the signal processing system needed for this purpose. Rather than the signal processing system needing to determine the frequency of transmission of bit pulses in the optical signal, the signal processing system can independently find the beginning of each bit pulse and then determine what logic value it represents. This is accomplished through repeated sampling of the optical signal (after conversion to an electrical signal) by the system, following a determination of a logic value in a bit pulse, during the remaining low optical intensity magnitude portion of that pulse until a transition to a high optical intensity magnitude is detected indicating the start of the next bit pulse. That is, the start of each pulse can be determined without the signal processing system being prompted by a clock signal derived from the incoming optical signal.

Furthermore, the modulation arrangement depicted in the example in FIG. 2B is effective in avoiding problems otherwise encountered because of fluctuations in the optical signal. The use of low bit rates, leading to longer periods for the bit pulses in the waveform of the optical signal, allows time to repeat the sampling at each sample point of interest a number of times to thereby provide an averaged sample result. Such averaging allows momentary fluctuations to dissipate without much effect on the value of the sample used in subsequent signal processing when that sample value is provided as an averaged value.

Because the front edge of a bit pulse is independently found as a reference point, a further averaged sample can be scheduled to be taken at a selected specific time later during the period of that pulse best chosen to determine whether that pulse represents a logical value of "0" or "1". Such subsequent sample points are shown in FIG. 2B by those other tick marks which extend upward only which occur just prior to the two-thirds point of the pulse period for each of the bit pulses following the leading edge thereof. This means that sampling at other times between the reference leading edge of the pulse and the two-thirds period bit value determination point can be avoided so that fluctuations occurring between these times are ignored. Hence, expensive measures to deal with such fluctuations in the signal processing circuitry can be avoided as well as the added complexity they would otherwise bring thereto.

The method of sampling essentially involves measuring the photon density in the optical signal until a specified electron charge is reached which is accomplished in a shorter or longer time depending on the optical intensity magnitude of the optical signal at the point of sampling. The arrangement for doing so in signal processor and selector system 23 begins with directing the photodetector output signal current over one of leads 22 to an integrating capacitor, 30, which is correspondingly charged by that current. The other of leads 22 extends to a terminal at which electrical energy is supplied. In beginning a sampling, capacitor 30 is initially discharged so that the charging thereof is directly representative of the optical intensity of the optical signal at the time of sampling as converted by photodetector 20 to the electrical output signal actually sampled during the time of this charging. Thus, the voltage increase over time across capacitor 30 due to the charging thereof by the output current from photodetector 20 is a measure of the intensity of the optical signal impinging on photodetector 20 during this charging.

Multiples of such individual samples can be obtained in a relatively short time to provide the data for averaging such multiple samples into an averaged sample value through the use of a switch, 31, which is directed to switch between a discharging resistor, 32, allowing the discharging of capacitor 30 to initialize it for a further sampling, and the input of a multiple threshold level analog comparator, 33, this switching being under the direction of an operation, sampling and conversion controller, 34. A higher value charging, or direct, threshold is used when switch 31 connects integrating capacitor 30 to the input of comparator 33 for purposes of determining when the voltage on capacitor 30 has exceeded this higher charging threshold. The value of this threshold is typically one-half the operating voltage supplied to comparator 33 (not shown in FIG. 2A). A significantly lower discharging threshold is effective in comparator 33 during the times switch 31 connects capacitor 30 to discharging resistor 32 to discharge that capacitor in readying it for the next sampling. An indication of the output value of comparator 33 is checked by controller 34 to reassure that capacitor 30 has been discharged below this discharging threshold within the time allotted therefor, that time typically being six time constants for the circuit formed by capacitor 30 and being connected to resistor 32 through switch 31.

Each sampling that is initiated by operation, sampling and conversion controller 34 through using switch 31 to connect integrating capacitor 30 to comparator 33 is accompanied by simultaneously directing a clock signal therefrom to a counter, 35, which counts those clock signal pulses during the charging of capacitor 30. Such counting continues until comparator 33 indicates that the voltage on capacitor 30 has risen above the charging or direct threshold so that this count is a measure of the time that has elapsed during the charging, and then controller 34 stops the counting in counter 35 and sends a signal to an accumulator, 36, to receive the count accumulated in counter 35 at that point. Controller 34 further directs accumulator 36 to add this latest found elapsed time to the sum of the values of previously found elapsed times kept in a register therein.

Typically, elapsed times are found for 85 individual capacitor chargings, or individual samplings, to provide 85 data points for forming an averaged sample value. Hence, accumulator 36 adds the elapsed time for each of 85 chargings of capacitor 30 to the total of such elapsed times kept therein with, as indicated above, each of these elapsed times being inversely related to the intensity magnitude of the optical signal at the time of the corresponding sampling. This inverse relationship occurs because the greater the optical signal intensity, the shorter the time until the voltage on capacitor 30 exceeds the charging or direct threshold of comparator 33.

Thus, at the end of these 85 individual samplings being used to determine an averaged sample value, the sum of the individual samplings resides in accumulator 36. This summed value represents the average of the individual samplings to within a constant (1/85). If that sum is sufficiently small, a relatively high intensity is determined to have occurred in the optical signal at the time of sampling, but if sufficiently great, than a relatively low intensity is determined to have occurred at that time. Determining whether the total of the elapsed times accumulated in accumulator 36 is sufficiently large or sufficiently small requires that such a sum of individual sample elapsed times be compared with some standard properly chosen to distinguish between the elapsed time sums in accumulator 36 representing high and low optical signal intensity magnitudes. This determination is made in a digital comparator subsystem, 37, which compares the total of the elapsed times for each sampling averaged value with an accumulated threshold, 38, earlier determined. Typically, an averaged value can be obtained and compared within 50 $\mu$s to 6 ms.

This determination of an accumulated threshold suitable for use with the sum of the individual sample elapsed times, representing an average thereof to within a constant, is found by applying the sampling process to an electrical output signal from photodetector 20 corresponding to the optical signal being at a relatively low intensity value. Assuring that the optical signal is at such a value can be done, for instance, in connection with the use of a video tape by storing magnetic patterns thereon that keep core display screen portion 17 radiating at a low intensity magnitude value for a few seconds after start-up of that video tape on a video tape recorder directing the appearance of visual images on screen 14 of television 10 accompanied by a request to the user in those visual images to start operation of signal processor and selector system 23. The individual samples of the corresponding low intensity optical signal are taken as described above to provide the sum of the elapsed times due to each such sampling in a register in accumulator 36.

The value of that sum is then shifted one time to the right in that register in accumulator 36 to be effectively divided by two. This halved value is replicated and stored in a further register and shifted to the right one more time to form a quartered value which is then added to the halved value in the first register. Finally, the quarter value is shifted to the right a further time in the second register to form an eighth value which is then added to the halved and quartered values summed in the first register to form the final value for the accumulated threshold. This value for the accumulated threshold is then transferred to an accumulated threshold register, 38, for use with comparator system 37. This accumulated threshold thus has a value of $$\text{Accumulated Threshold Value} = \frac{\text{total elapsed time}}{2} + \frac{\text{total elapsed time}}{4} +$$

-continued $$\frac{\text{total elapsed time}}{8}$$

$$= 0.875 \text{ total elapsed time.}$$

Thus, the accumulated threshold value is equal to 87.5% of the total of the individual sample elapsed times found as the averaged sample of the optical signal during a portion thereof when it is at a relatively low intensity magnitude, that is, at time when core generating display screen portion 17 was at its dark value.

This accumulated threshold value then is used to discriminate between those totals of elapsed times for averaged samples of the optical signal representing a relatively high optical intensity magnitude and those representing a relatively low optical intensity magnitude. If the averaged value samples are those taken near the two-thirds period point in bit pulses following the corresponding leading edges thereof to determine whether each such pulse represents a logical value of "1" or a logic value of "0" and they are compared in comparator subsystem 37 with the accumulated threshold stored in register 38, each such bit pulse can be taken to represent a "1": if Accumulated Threshold>Total Elapsed Time or a "0": if Accumulated Threshold≧Total Elapsed Time.

Upon completion of such a comparison in comparator subsystem 37, operation, sampling and conversion controller 34 clears, or initializes, accumulator 36 to ready it for obtaining the next averaged sample.

This process of forming an averaged sample value results in a further low-pass filter behavior for the sampling arrangement in addition to the low-pass filter response of photodetector 20 indicated above. The cutoff frequency for this filter response is set by the integration time of capacitor 30, the number of individual chargings of that capacitor and, assuming that the system of FIG. 2A is implemented in a microcontroller from switch 31 onward except for the output indicators and the keys, the nature of the microcontroller arrangement for incoming voltage signals. The cutoff frequency for the upper end of the low pass filter characteristic can be approximated by Cutoff Frequency=(Photodetector 20 Resistance)×($C_{30}$)×(number of Individual Capacitor Chargings)×(Number of Time Constants at which Capacitor Charging is Terminated), with $C_{30}$ being the capacitance of integrating capacitor 30. This cutoff frequency is variable, but typically provides a value of 330 Hz.

Having described the information recovery portion of signal processor and selection system 23 following photodetector 20 in the foregoing, the operation of the remainder of system 23 of FIGS. 1B and 2A will be described. This description will be for the example of a system which makes use of such an information recovery arrangement to determine the correctness of responses to questions posed on screen 14 of television 10 provided from a data source controlling the appearances of visual images on that screen including coordinated provisions of corresponding data packets optically transmitted by an optical signal formed by radiation from core display screen portion 17. Such an optical signal is received across the optical channel by photodetector 20 and signal processor and selection system 23 to thereby receive the data packets each containing a binary number indicating the proper response to the corresponding question.

The operation of the system of this example will be explained in connection with the flow charts of FIGS. 3A through 3E along with the block diagram of FIG. 2A and the representation of signal processor and selection system 23 shown in FIG. 1B. Variations of this system can be used with the information recovery arrangement described above as can other types of systems.

The choice of a cadmium sulfide photoconductor for the photodetector used in the system shown in FIGS. 1B and 2A, as indicated above, requires some initial conditioning procedures to place that photodetector in the proper condition for converting optical signals to electrical signals. Cadmium sulfide photodetectors, if exposed to a relatively strong light for a sufficiently long period or prevented from receiving any significant light for a sufficiently long period, will initially be characterized in operation by having a much smaller or a much greater resistance, and a slower response time, than they will exhibit after a short time of normal operation as they then begin to approach their normal operating characteristics. As a result, the user, in the situation in which a video tape recorder is used as the data source to control the appearances of visual images on screen 14, is provided with some corresponding instructions.

The user, after inserting the video tape in the recorder and starting that recorder to begin displaying the visual images specified thereon, is instructed in those visual images to delay start of operation of the signal processing and selection system 23. During this delay, assuming suction cup 21 and photodetector 20 are mounted on glass 11 across from transmitter display screen portion 15, an appropriate photodetector conditioning sequence of varying optical intensities is displayed in core display screen portion 17 and transmitted thereto to hasten its reaching its normal operating condition. The choice of a different kind of photodetector, such as a phototransistor or a photodiode, would lead to a change in the conditioning signal from core display screen portion 17 or the elimination of such a signal altogether. Following such a conditioning sequence, the user is instructed to operate a manual power switch, 40, of signal processing and selection system 23 to electrically energize the circuitry in system 23 which operation is indicated in connection with a function block, 41, in FIG. 2A. This initial operation as the start of operation of system 23 is indicated by the "start" balloon at the beginning of the flow chart shown in FIG. 3A, and the following activity box, 42, in that chart.

Once electrical power has been supplied to the circuits of system 23 as indicated by the short dashed-lines extending therefrom to other component blocks, various registers in the system are then cleared, timers and microcontroller flag registers are reset, etc. through actions initiated in function block 41 as is marked in a further activity box, 42', in FIG. 3A indicating that such a system initialization is undertaken. In addition, an audio greeting message is initiated in power on and system initialization function block 41 in FIG. 2A to generate an output signal in a further function block, 43, for a small loudspeaker, 44, shown in FIG. 1B and in a further component block in FIG. 2A. This activity results in the audio message being delivered to the user through loudspeaker 44, an activity indicated in a further activity box, 45, in the flow chart of FIG. 3A.

Thereafter, the initial finding of an averaged sample is undertaken in accord with the description given above. As indicated there, a process of repeated individual samplings is undertaken at the sampling time of the output signal from photodetector 20 after conversion by that photodetector of the corresponding incoming optical signal impinging thereon. These multiple individual samples are then averaged to provide an averaged sample value for that sampling time. Obtaining this averaged sample value is begun by starting the operation of a 25 ms conversion timer in controller 34 as indicated in a further activity box, 46, in FIG. 3A. The 25 ms determined by the timer is the time allotted for such an averaged sample to be formed. In addition, the number of individual samplings is selected to be 85 as indicated above, and so a sample counter in controller 34 is preset to have therein a sample count N with a value of 85 as indicated in a subsequent activity box, 47.

Thereafter, as described above, the elapsed time for the output signal of photodetector 20 to charge conversion capacitor 30 to a voltage exceeding the charging or direct threshold of comparator 33 is measured by controller 34 in FIG. 2A through directing the process to start by connecting capacitor 30 to the input of comparator 33 through switch 31 and by supplying a clocking signal to counter 35 as set out in the next activity box, 48, in FIG. 3A. That elapsed time found in counter 35 is then added in accumulator 36 to the previous elapsed times found in this determination of this averaged sample value as indicated in the following activity box, 49. Once the direct threshold of comparator 33 is exceeded, switch 31 is directed to disconnect comparator 33 from capacitor 30 and to instead connect discharge resistor 32 thereto to discharge that capacitor, this being indicated in the next activity box, 50.

Following the finding of this individual sample elapsed time and the adding of it to the sum in accumulator 36, and after the subsequent discharging of capacitor 30, the sample count N is decremented from its then current value in the sample counter in controller 34 as is shown in the next activity box, 51. At that point, controller 34 checks to determine whether the value of sample count N has reached zero or not as indicated in a decision diamond, 52. If not, a further individual sample is undertaken as indicated by the arrow leading from decision diamond 52 to a point ahead of activity box 48. On the other hand, if 85 individual samplings have been completed, controller 34 further checks in another decision diamond, 53, whether the conversion timer has timed out the 25 ms allotted for finding an averaged sample and, if not, waits until this 25 ms conversion period has elapsed.

Once that conversion time period has ended, controller 34 in FIG. 2A causes the above described shifting and adding in accumulator 36 to form an accumulated threshold equal to 0.875 times the sum of the individual elapsed times, i.e. 0.875 times the total elapsed time, as indicated in another activity box, 54, in FIG. 3A. The accumulated threshold thus determined is then stored in register 38.

At this point, controller 34 starts an inactivity five minute timer in a further activity block, 55. Controller 34 does this through comparator subsystem 37 in FIG. 2A to start the timer in a function block, 56. This completes the initial activities in signal processing selection system 23, as set out in the flow chart shown in FIG. 3A, and the operation of this system then shifts from the balloon "A" at the end of the flow chart in that figure to the corresponding balloon "A" at the beginning of the flow chart shown in FIG. 3B.

As seen in FIG. 2A, the initiating of a finding of an averaged sample is shown controlled by controller 34 through the long dashed-line connections extending from that controller to switch 31, counter 35, accumulator 36 and comparator subsystem 37. The signalling from controller 34 to comparator subsystem 37 is also carried through that comparator to the initiation of the 25 ms conversion timer in a further function block, 57, in FIG. 2A. Conversion timer function block 57 is further connected to a "set" function block, 58, that is in turn connected to a data shift register, 59. Set function block 58 performs enable and latching functions with respect to data register 59 to get that register set to accept or reject at appropriate times data being transferred to it. Data register 59 is prevented from accepting data from digital comparator subsystem 37 outside of the 25 ms time out period of the conversion timer. Thus, data can be accepted in data register 59 only during those 25 ms time periods following initiation of a timing out of the conversion timer.

Figure 3B:
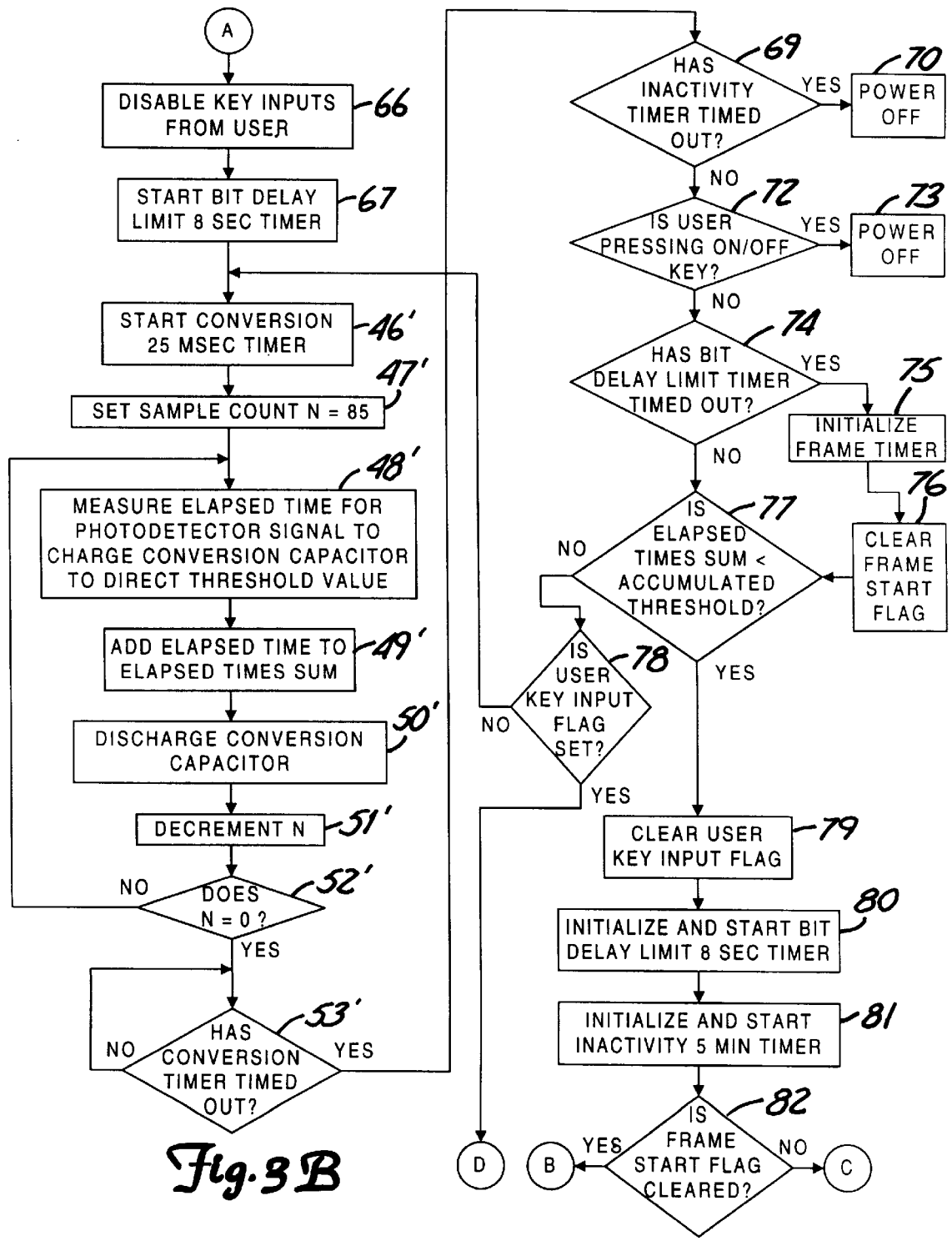
Figure 3D:
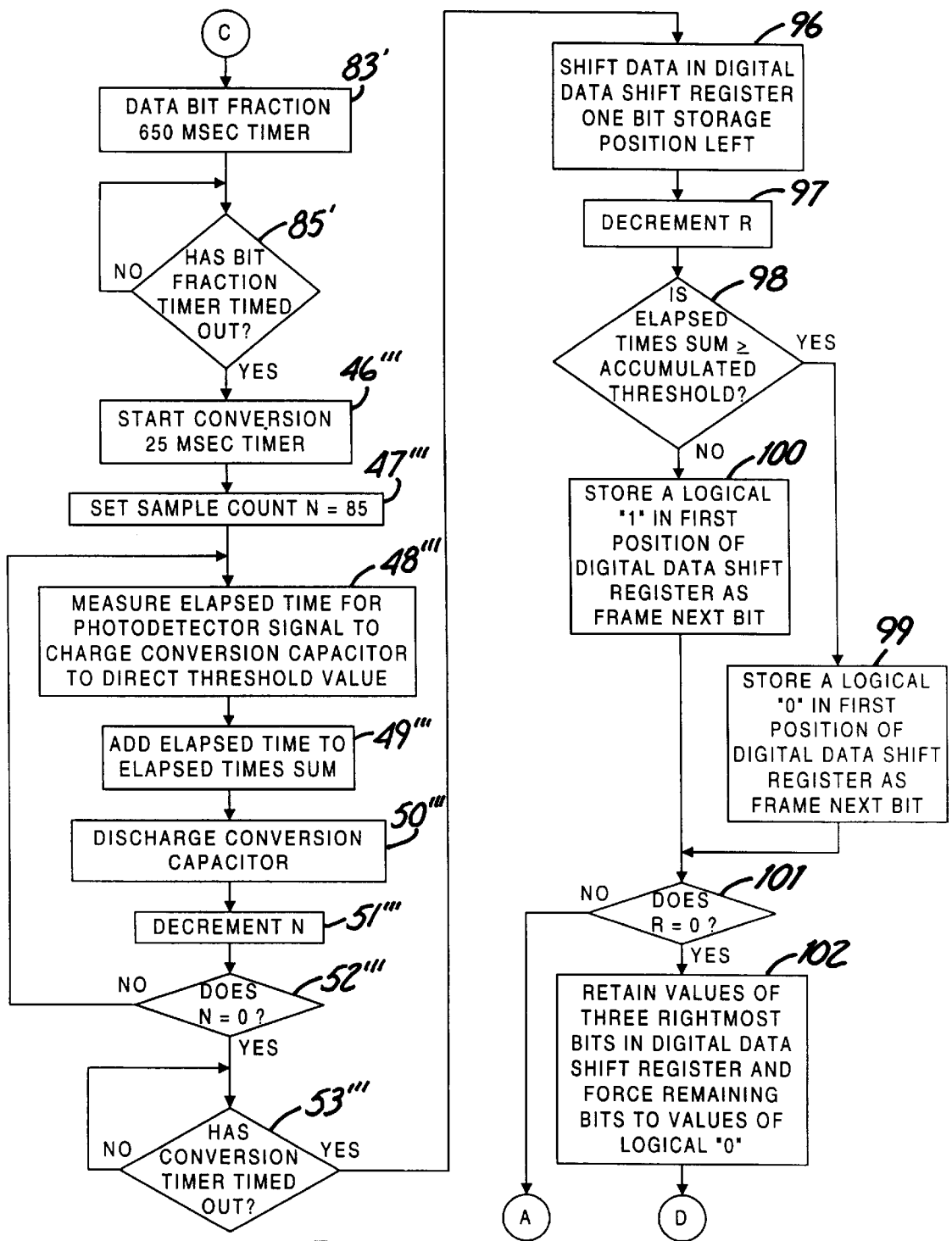

Controller 34, in following the flow chart set out in FIG. 3B, directs the system of FIG. 2A to find a leading edge of a higher optical intensity magnitude pulse in the optical signal by looking for the leading edge of a corresponding pulse in the electrical output signal of photodetector 20. This is accomplished in a looping arrangement in the flow chart of FIG. 3B in which repeated averaged samples are found until one of those averaged samples indicates a relatively high optical intensity magnitude has been detected. Once detected, the system can follow alternative subsequent processes depending on the status of the system at the time of detecting such a leading edge relatively higher optical intensity.

In starting this process, controller 34 first disables any key signal inputs would result from a user operating any of a set of keys, 60, 61, 62, 63 and 64, shown in FIG. 1B, as indicated as an input function block, 65, in FIG. 2A. This disabling of key inputs by the controller is indicated in an activity box, 66, in FIG. 3B.

Next, controller 34 starts the timing out of an eight second start bit delay limit timer as set out in a further activity box, 67, in FIG. 3B acting through comparator subsystem 37 in FIG. 2A to initiate this timing out in a function block, 68. This bit delay limit timer is used in this instance to limit to eight seconds the response of system 23 in anticipating a transmission of a packet or frame of information bit pulses upon the occurrence of a lower optical intensity to a higher optical intensity transition in the optical signal, assumed to be a bit pulse leading edge, if no further bit pulses are received for a time in that signal. This bit delay limit timer prevents the entry of data from comparator subsystem 37 into register 59 outside of times that timer is timing out through its connection through set function block 58 to data register 59. Such a result could occur, for instance, if the video tape recorder or the television was switched to off during use, or suction cup 21 was removed from glass 11 during use, or the like.

The search for a leading edge of a pulse of increased optical intensity magnitude is undertaken by obtaining repeated averaged samples until one is obtained that indicates a sufficient increase in optical intensity has occurred. Thus, the averaged sample procedure used in forming the accumulated threshold in the flow chart of FIG. 3A is repeated in the flow chart of FIG. 3B following the start of the bit delay limit timer. Hence, the activity boxes and decision diamonds involved in this activity in the flow chart of FIG. 3B that match corresponding ones in the flow chart of FIG. 3A carry the same numerical designations in FIG. 3B that they had in FIG. 3A except for the addition of a prime mark thereto.

Once an elapsed times averaged sample has been obtained, controller 34 checks whether the five minute inactivity timer started in block 55 in FIG. 3A has timed out in a further decision diamond, 69. If so, electrical power to system 23 is, as a result, shut off as is indicated in a further activity box, 70, in FIG. 3B, and by a function block, 71, in FIG. 2A shown activated there by inactivity timer function block 56 being connected thereto.

Controller 34 then checks in a further decision diamond, 72, in FIG. 3B as to whether the user is operating the power on and off key 40 of FIG. 1B to provide a signal from key input function block 65 in FIG. 2A. If so, the result again is power being shut off as is indicated in a further activity block, 73. This is indicated in FIG. 2A by a connection from each of key input block 65 and controller 34 to a key scan subcontroller, 34', which in turn is connected through a further connection arrangement, described below, to function block 71 representing the power termination function. Subcontroller 34' permits the polling of the keys in key input block 65 to determine the presence of a key signal resulting from the operation of one of keys 60 through 64 or key 40 because of manual selection thereof by the user.

If the user is not operating key 40, controller 34 checks in a further decision diamond, 74, whether the bit delay limit timer started in block 66 has timed out. If so, the frame timer is reset to zero and the frame start flag is cleared in a further pair of activity blocks, 75 and 76. This readies the system 23 for the start of a new frame as the previous frame has been shown to be invalid by the timing out of the bit delay timer which is reset after each subsequent leading edge of further bit pulses in the frame as will be described below.

Thereafter, the elapsed times averaged sample that has been obtained, as indicated by the time out of the conversion timer in decision diamond 53', is compared in a further decision diamond, 77, with the accumulated threshold found in block 54 of FIG. 3A to determine whether that averaged sample indicates that a relatively high optical intensity was occurring or a relatively low optical intensity was occurring. This determination for the averaged sample magnitude is done directly in the situation where the bit delay timer has not yet timed out as a valid frame of data may be in progress of transmission and reception.

If the averaged sample of elapsed times in that situation is of a value greater than the accumulated threshold, a relatively low intensity optical signal has been present during the sample time so that a leading edge of a relatively high intensity pulse has not been found. In this situation, controller 34 further checks in another decision diamond, 78, as to whether a flag register in controller 34 is indicating readiness to accept inputs from a key in function block 65 of FIG. 2A based on manual selections thereof by the user.

If such a flag is not set after the determination that a low intensity optical signal is present at the time of obtaining the averaged sample, controller 34 completes the loop by undertaking to obtain a further averaged sample as shown by the arrow in FIG. 3B extending from decision diamond 78 to just above activity block 46'. If, on the other hand, the flag register corresponding to key inputs is set, system 23 is awaiting a signal from a key selected by the user which involves further activities which are set out in the flow chart in FIG. 3E that starts with the balloon designated "D" in that figure.

If, in decision diamond 77, the averaged sample of elapsed times obtained has a value less than the accumulated threshold, the optical signal had a relatively high optical intensity at the time the averaged sample was obtained. In this circumstance, a leading edge of a relatively higher optical intensity pulse has been found by comparator subsystem 37 as determined by controller 34 in decision diamond 77. In such a circumstance, any previous setting of the flag register indicating system 23 is awaiting a manual selection of a key by the user is terminated in a further activity box, 79. This, as will be seen below, indicates that the data source controlling the logic values in the optical signal being transmitted from core display screen portion 17 is able to control the amount of time a user has to make a manual selection of a key.

Thereafter, control system 34 initializes the eight second start bit delay limit timer which is set to zero elapsed time and then restarts the timer in a further activity box, 80, in FIG. 3B acting through comparator subsystem 37 and function block 68 in FIG. 2A. This has the effect of synchronizing the start bit delay limit timer with the now detected leading edge of the higher optical intensity pulse just found. Similarly, controller 34 initializes the five minute inactivity timer in function block 56 through comparator subsystem 37 to a zero elapsed time value and restarts that timer as indicated in another activity box, 81, in FIG. 3B. As a result, the five minute inactivity period is reset to give the user a renewed 5 minute inactivity period before controller 34 shuts off electrical power to system 23.

Once a leading edge has been detected, there is a different procedure to be followed depending on whether that leading edge is the leading edge of a start bit higher optical intensity pulse or the leading edge of a data bit higher optical intensity pulse in the bit pulses in forming a data packet or frame. Thus, controller 34 determines in a further decision diamond, 82, whether a flag register therein for the frame start flag has been cleared. If so, the leading edge is that of a start bit and further activities in system 23 are undertaken in the flow chart set out in FIG. 3C beginning at the balloon designated "B". If the frame start flag has not been cleared, the leading edge is of a data bit pulse in a packet resulting in further activities of system 23 following the flow chart set out in FIG. 3D beginning at the balloon designated "C".

Considering first that the detected leading edge is of a start bit pulse in the optical signal from core display portion 17, controller 34 starts the time out of a 650 ms start bit fraction timer in a further activity box, 83, below the balloon designated "B" in FIG. 3C. This is shown in FIG. 2A by controller 34 acting through comparator subsystem 37 to initiate the timing out of the 650 millisecond bit fraction timer shown in a further function block, 84, in that figure. That timer, in being connected to set function block 58, in turn connected to data register 59, acts to prevent data from being received into data register 59 during its timing out.

Returning to FIG. 3C, controller 34 checks as to whether the start bit fraction timer has timed out in a further decision diamond, 85. If not, controller 34 waits until such a time-out has occurred. After such an occurrence, controller 34 is ready to obtain another elapsed times averaged sample during the 25 ms immediately following the time-out of the start bit fraction timer. This initiation of the 25 ms conversion timer by the time out of the 650 ms bit fraction timer is shown in FIG. 2A by the arrow extending from the start bit fraction function block 84 to the conversion timer function block 57.

This elapsed times averaged sample is obtained solely to determine whether the relatively high optical intensity leading edge found in decision diamond 77 in the flow chart of FIG. 3A is indeed a start bit which is required to have a logical value of "1". Thus, the average sample is taken to determine whether the relatively higher optical intensity previously found to indicate a leading edge has continued to the 650 millisecond point past that leading for that pulse.

An averaged sample of elapsed times is obtained in the flow chart of FIG. 3C in just the same manner it was obtained in each of FIGS. 3A and 3B. Hence, the corresponding activity blocks and decision diamonds in FIG. 3C provided for this purpose are numbered as they were in FIG. 3A but with the addition of two prime marks in FIG. 3C.

The elapsed times averaged sample obtained upon the time-out of the conversion timer in decision diamond 53" is then directed by controller 34 to be compared by comparator subsystem 37 with the accumulated threshold in register 38 in a further decision diamond, 86. If the elapsed times averaged value in accumulator 36 is greater than the accumulated threshold indicating a low optical intensity has been found in this sampling, either an unwanted optical fluctuation occurred during the previous sample time falsely indicating a leading edge or a pulse signifying a logical value of "0" was transmitted, and this pulse cannot be a pulse serving as a start bit. As a result, controller 34 clears the flag register for the frame start flag in activity box, 87, to ensure that system 23 is not operating as though it were beginning a valid frame of data. Instead, controller 34 starts a frame length limit eight second timer in a following activity box, 88. Controller 34 performs this function through comparator subsystem 37 in FIG. 2A being connected to a further function block, 89, representing the frame length limit timer function.

Controller 34 then waits for this frame length limit timer to time-out as indicated in a further decision diamond, 90, in FIG. 3C to bring system 23 past the next seven bit pulse periods so as to prevent the possibility of erroneously determining a subsequent bit pulse in the same packet or frame is a start bit pulse. Since the frames have some time separation between them in being transmitted due to awaiting user response input, there is adequate time for the frame length limit timer to time out and leave the system ready to receive the next transmitted frame. Thereafter, controller 34 returns system operation to the flow chart of FIG. 3B to again begin searching for the next low to high optical intensity magnitude transition that will indicate the leading edge of the next bit pulse transmitted.

If, however, controller 34 determines in decision diamond 86 of FIG. 3C that the averaged value of elapsed times in accumulator 36 is less than the accumulated threshold in register 38, indicating that a relatively high optical intensity magnitude has been detected, the leading edge previously detected in decision diamond 77 is confirmed to be that of a bit pulse having the logic value "1". Since the system is operating in the flow chart of FIG. 3C because the frame start flag was noted to be cleared in decision diamond 82 of FIG. 3B, no other bit pulses have been detected for this frame and so this bit pulse is determined to be the start bit for another frame. In that situation, controller 34 directs comparator subsystem 37 to transfer a logical "1" data register 59 and ,through comparator subsystem 37, directs data register 59 to receive this logical value and store it in the first position of that shift register as a frame start bit as indicated in a further activity block, 91, in FIG. 3C. Controller 34 then sets the count value R of a data receptions counter therein to a value of six in a further activity block, 92, for the purpose of determining when six data bits derived from the next six data bit pulses have accumulated in data shift register 59.

Controller 34 then sets the frame start flag in a following activity block, 93, to indicate the start of a frame or data packet. Controller 34 accomplishes this setting of the frame start flag through comparator subsystem 37 in its connection to a further function block, 94, in FIG. 2A representing this frame start flag function.

Controller 34 also initializes and starts the frame length limit eight second timer through comparator subsystem 37 being connected to the frame length limit timer function block 89 in FIG. 2A. This action is indicated in a further activity block, 95, in FIG. 3C. Thereafter, controller 34 returns system operation to the flow chart of FIG. 3B to again begin searching for the next low to high optical intensity magnitude transition which will indicate the leading edge of the next bit pulse transmitted, a bit pulse which will be taken to be a data bit pulse in view of the setting frame start flag in activity block 93.

In the alternative situation at the end of the flow chart in FIG. 3B in which the frame start flag is determined to not be cleared in a determination made in decision diamond 82, this frame start flag is indicating that a start bit pulse has already been determined to have occurred. Thus, the last leading edge of a bit pulse found in decision diamond 77 is that of one of the data bit pulses expected for the current frame or packet of data. In that situation, controller 34 directs system 23 to follow the flow chart set out in FIG. 3D beginning with the balloon designated "C".

Here again, controller 34 first starts the time out of the data bit fraction timer and awaits its completion in just the manner of starting out the start bit fraction timer and awaiting its completion in the flow chart of FIG. 3C. Hence, the designations used in the flow chart of FIG. 3C for the activity block and decision diamond involved in these activities there are used for the corresponding activity block and decision diamond in the flow chart of FIG. 3D but with the addition of a prime mark. Controller 34 again acts through comparator subsystem 37 to initiate this bit fraction timer in function block 84 in FIG. 2A.

Once the data bit fraction timer has timed out as checked in decision diamond 85', controller 34 is again ready to obtain another elapsed times averaged sample during the 25 ms immediately following the time-out of the start bit fraction timer just as was done in the flow chart of FIG. 3C. Again, an averaged sample of elapsed times is obtained in the flow chart of FIG. 3D in just the same manner such samples were obtained in the flow charts of each of FIGS. 3A, 3B and 3C. So, once again, the corresponding activity blocks and decision diamonds in FIG. 3B provided for this purpose are numbered as they were in FIG. 3A but with the addition of three prime marks in FIG. 3D.

Before comparing the elapsed times averaged value obtained at the time-out of the conversion timer in decision diamond 53''', controller 34 shifts the data in data shift register 59 one bit storage position to the left to make room for the bit value next be stored therein upon completion of the coming comparison. This is shown in a further activity block, 96, in FIG. 3D. Anticipating the storage of this next bit value, the count value R of the data receptions counter in controller 34 is decremented in a following activity block, 97.

Thereafter, the elapsed times averaged sample obtained upon the time-out of the conversion timer in decision diamond 53''' is then directed by controller 34 to be compared by comparator subsystem 37 with the accumulated threshold in register 38, and the comparison result is checked in a further decision diamond, 98. If the elapsed times averaged value in accumulator 36 is greater than or equal to the accumulated threshold, thereby indicating a low optical intensity has been found by this sampling, a logical "0" is being represented by the transmitted data bit pulse. In this circumstance, controller 34 directs comparator subsystem 37 to transmit a logic "0" to data shift register 59, and directs data shift register 59 through comparator subsystem 37 to receive that bit value and store it in the first storage position therein as indicated in a further activity box, 99. This bit value is taken as the next bit value for the frame.

If, on the other hand, the elapsed time averaged value in accumulator 36 is found in decision diamond 98 to be less than the accumulated threshold, thus indicating a relatively high optical intensity has been found in this sampling, the data bit pulse is one representing a logical value of "1". In that circumstance, controller 34 directs that a bit value of "1" be transmitted by comparator subsystem 37 to data shift register 59 and stored in the first storage position in that shift register as the next bit in the frame as indicated in the further activity block, 100, in FIG. 3D.

Once the bit value of the data bit pulse transmitted is stored in data shift register 59, controller 34 checks the count value R in the data receptions counter therein to determine whether it has reached a value of zero as indicated in a further decision diamond, 101. If not, controller 34 directs operation of the system to follow the flow chart set out in FIG. 3B beginning at the balloon designated "A" in a search for the leading edge of the next data bit pulse in the optical signal being transmitted from core display screen portion 17 to detect the occurrence of this next pulse. If, however, the count value of R in the data receptions counter does equal zero, a complete set of data bits for a frame or packet has been obtained and stored in register 59 of accumulator 36. There is no concern in the system over the end bit pulse of the current frame. This end bit pulse will be transmitted during the waiting time for the user input in response to the visual images on screen 14 posing a question to the user corresponding to the answer now in shift data register 59, and so no actions will be taken in the system with regard to the occurrence of that end bit pulse.

Because the example being described for the system using the data recovery arrangement set out above makes use of only the three least significant data bits in the packet or frame of data obtained, controller 34 acts to mask out the other bits by forcing them all to take on a logical value of "0" to aid in protecting the system against unwanted optical fluctuations or other sources of noise having erroneously caused one of the unused bit values to take a logical value of "1" instead of being a "0". This is indicated in a further activity block, 102, in FIG. 3D. Once this masking operation is completed to leave only the three significant bits possibly having values other than logical "0", controller 34 directs the operation of the system to follow the one of the two flow charts in FIG. 3E beginning with the balloon designated "D".

In the flow chart on the left in FIG. 3E that starts with the balloon designated "D" which is first reached only after a complete data packet or frame has been stored in data shift register 59, controller 34 first enables the receipt of key code signals that are initiated by the user operating any of the keyboard keys 60 through 64 of FIG. 1B involved in keyboard input block 65 of FIG. 2A. Controller 34 polls these keys through subcontroller 34' in a conventional manner to detect such signals. This enabling and receipt of key code signals is indicated in a further activity block, 103, in FIG. 3D. Controller 34 goes on to clear the frame start flag through comparator subsystem 37 in FIG. 2A being connected to function block 94 representing this activity. This activity is indicated in a further activity block, 104, in FIG. 3D. In the same manner, controller 34 initializes the eight second bit delay timer in the following activity block, 105, since an unduly delayed bit is no longer an issue upon the completion of a data packet.

Controller 34 then checks a flag register therein as to whether the associated key input flag has as of yet been set in a further decision diamond, 106. Upon an initial pass through this flow chart, this key input flag will not have yet been set. As a result, controller 34 initializes and starts a 15 second maximum user response period timer in a further activity block, 107. This function is accomplished in FIG. 2A by controller 34 acting through comparator subsystem 37 which is connected to a further function block, 108, representing the maximum user response period timer function.

The starting of the maximum user response period timer then leads to the blinking of a yellow light-emitting diode, 109, shown both in FIG. 1B and in a further function block in FIG. 2A. This blinking of light-emitting diode 109 serves as an indication to the user that a response to a question, or other activity in the visual images on screen 14 of television 10, is now appropriate. That activity is indicated in a further activity block, 110, in FIG. 3E. If, on a subsequent use of the flow chart starting with a balloon designated "D" in FIG. 3E, which will occur in the absence of a user response while the system is awaiting same as will be described below, the determination in decision diamond 106 that the user key input flag is set, as will be described below, also leads to a further blinking of light-emitting diode 109 as again is indicated in activity block 110 in FIG. 3E.

Once the maximum user response period timer has begun timing out and light-emitting diode 110 has blinked to request a response from the user, controller 34 determines in a further decision diamond, 111, whether the user has operated any of keys 60 through 64 in FIG. 1B, i.e. if any key input signals have emanated from key input function block 65 in FIG. 2A. If so, controller 34 directs operation of the system to the flow chart also shown in FIG. 3E but the one starting with a balloon designated "E". If not, controller 34 determines in a further decision diamond, 112, whether the maximum user response timer has timed out its fifteen second period. If not, controller 34 sets a flag register therein for the user key input flag in a further activity block, 113, in FIG. 3E, and does so through comparator subsystem 37 in being connected to a further function block, 114, representing that function in FIG. 2A. Once the key user input flag has been set, controller 34 directs operation of the system back to the flow chart shown in FIG. 3B starting with the balloon designated "A" to search for a leading edge of another bit pulse after disabling user key inputs in block 66. In this FIG. 3B flow chart, in the absence of finding leading edges of any further bit pulses, controller 34 in decision diamond 78 therein will direct the system to again proceed through the flow chart in FIG. 3E beginning with the balloon designated "D" to further await response from the user via one of keys 60 through 64 after again enabling them in block 103.

This switching back and forth of the system between the operations set out in the flow charts beginning with the balloons designated "D" and "A" continues until a) the user has pressed one of keys 60 through 64 to then be directed to the other flow chart in FIG. 3E beginning with the balloon designated "E" as indicated above, or until b) a leading edge is found of a newly transmitted bit pulse which will lead to the system seeking to determine whether a start bit is now present in decision diamond 77 of FIG. 3B eliminating the enabling of the keys for a user response to thereby prevent the user from responding, or until c) the maximum user response period timer has timed out as will be described below. Clearly, this arrangement allows the data source controlling core display screen portion 17 to transmit another bit pulse to end the user's time to respond short of the 15 second time-out period of the maximum user response period timer.

In the situation of the maximum user response timer having timed out, controller 34, having made that determination in decision diamond 112 of FIG. 3E, directs the clearing of the user key input flag in the associated register therein as indicated in a further activity block, 115. After the clearing of this flag, controller 34 directs operation of the system back to the flow chart in FIG. 3B beginning at the balloon designated "A" for the purpose of searching for the leading edge of another bit pulse. The user's opportunity to respond is now terminated as it should be with the timing out of the maximum user's response period timer since the user in decision diamond 78 in FIG. 3B is no longer returned to the flow chart in FIG. 3E beginning with the balloon designated "D" with the clearing of the key input flag. Operation instead is directed to block 46' of FIG. 3B from where the search resumes for a leading edge of the next bit pulse to be transmitted.

The pressing of one of keys 60 through 64 in keyboard input 65 by the user leads in decision diamond 111, as indicated above, to controller 34 directing system operation to the flow chart in FIG. 3E beginning with the balloon designated "E". As a first matter, controller 34 initializes the five minute inactivity timer as indicated in a further activity block, 116. This function is shown in FIG. 2A by the pressing of a key in keyboard 65 leading to such an initialization of the five minute activity timer through the connection between keyboard input 65 and timer function block 56. This initialization of the inactivity five minute timer is the start of giving the user another five minutes of inactivity time before shutting off power as a result of an expressed desire for continued activity indicated by the user's pressing of one of keys 60 through 64. The five minute activity timer will be restarted when controller 34 directs the activity following the pressing of a key back to the searching for a leading edge in the next transmitted bit pulse in the flow chart of FIG. 3B as will be shown to occur below.

The operating of one of keys 60 through 64, detected in the polling therefor in subcontroller 34', leads to a key code signal emanating from key input function block 65 and subcontroller 34' in FIG. 2A to a key code signal look-up table in controller 34 as is indicated by a further function block, 117, representing the function of that look-up table. The corresponding key code value found in key code signal look-up table of block 117 is then sent to a further digital comparator, 118, through the connection between them shown in FIG. 2A. There, this key code value is compared with the stored unmasked data bit values in register 59 provided to comparator 118 over the connection therebetween, this comparison being made in a further activity block, 119, in FIG. 3E. The stored unmasked data bit values in register 59 were provided there as a result of the activity in block 102 in the flow chart of FIG. 3D. Controller 34 then determines the result of this comparison in a further decision diamond, 120, to ascertain whether the selected code value from the key code signal look-up table is equal to the unmasked data bits from register 59. A valid comparison for this purpose is allowed to be made during the timing out of the maximum user response period timer as is indicated in the connection extending from function block 108, representing that timer, to comparator 118 in FIG. 2A.

If the comparison shows the key code value equals the unmasked bits value, comparator 118 provides an output signal to output generator 43 to a) direct the providing of an audio message through loudspeaker 44, and to b) blink a light-emitting diode, 109', shown in FIG. 1B and as part of the function block 109 in FIG. 2A. This activity is shown in a further activity block, 121, in FIG. 3E.

If, on the other hand, the compared values are not equal, comparator 118 will provide an output to output signal generator 43 directing it to a) provide another, different audio message through loudspeaker 44, and to b) blink a red light-emitting diode, 109", again shown in FIG. 1B and as part of the function block 109 in FIG. 2A. Such an activity is indicated in a further activity block, 122, in FIG. 3E. In this situation of error, controller 34 further checks through in another decision diamond, 123, as to whether the key indication provided from look-up table 117 is that for on and off power key 40 in FIG. 1B rather than one of keys 60 through 64 in that figure. This occurs through controller 34 enabling subcontroller 34' of FIG. 2A to transmit that key indication to look-up table 117 which in turn directs the power to be switched off through its connection to function block 71 as indicated in a further activity block, 124, in FIG. 3E

When an effort to shut off the power has not been determined to have occurred in decision diamond 123, the response of the system to such an error is to allow the user further opportunities to select the proper key if the maximum user response timer has not timed out and no new bit pulse leading edge is detected. Even if a correct key selection has been made, the user is permitted to select that key again, or even another if desired within the same limits. Thus, following the results of either a correct key selection in block 121, or the results of an incorrect key selection in block 122 not involving the operating of on and off power button 40, controller 34 checks whether the maximum user response period timer has timed out in a further decision diamond, 125. If not, controller 34 then sets the user key input flag in a further activity block, 126, but if the timer has timed out, controller 34 clears this flag in an alternative activity block, 127. In either situation, controller 34 then directs operation of the system back to the flow chart in FIG. 3B beginning at the balloon designated "A".

This results in a further switching of system operation between this flow chart and the on the left in FIG. 3E beginning with the balloon designated "D" just as described above. As above, this can continue until a key is operated by the user, the leading edge of a another bit pulse is detected, or the user maximum response period timer times out.

Turning to FIG. 2A, most of the system shown in that block diagram can be provided on an integrated circuit chip and, in fact, can be implemented in commercially available microcontroller chips, such as the PIC16C57/XT chip from Microchip, Inc. used here, to which is added a few other components. These typically include photodetector 20, suction cup 21, leads 22 capacitor 30, keyboard 65, light-emitting diodes 109, 109' and 109", a power supply voltage regulator, a crystal for the oscillator serving as a master clock for the microcontroller, and miscellaneous switches, resistors, capacitors and transistors used in well known circuits supporting the microcontroller. In addition, loudspeaker 44 is another added component as is the integrated circuit chip used to operate it which has stored in chip memory the bases for the audio messages transmitted through loudspeaker 44. Thus, an economical system can be provided.

Although the present invention has been described with reference to preferred embodiments, workers skilled in the art will recognize that changes may be made in form and detail without departing from the spirit and scope of the invention.

What is claimed is:

1. A communication system for transmitting information by digital binary signaling over an optical channel, said system comprising:
   an optical transmitter provided by a selected portion of a visual display in a display device which can provide light at selected intensities to thereby provide sequences of light pulses in said optical channel such that durations of said light pulses therein represent binary logic states in accord with digital data provided to said optical transmitter from a data source to thereby form a binary pulse duration modulated optical signal in said optical channel, said light pulses in said sequences of said optical signal each having a minimum duration after such pulse begins;

a photodetector positioned across from said selected portion of said visual display to receive said optical signal from said optical channel and provide at an output thereof corresponding electrical signals serving as photodetector output signals; and a signal processor having an input electrically connected to said photodetector output to receive said photodetector output signals, said signal processor being capable of determining substantially when individual ones of said light pulses began and ended relative to neighboring said light pulses in said sequences thereof.

2. The apparatus of claim 1 wherein said sequences of light pulses are grouped into packets each having a start light pulse to begin each packet followed by further said light pulses to form that packet.

3. The apparatus of claim 1 wherein said photodetector is a photoconductor.

4. The apparatus of claim 1 wherein said photodetector is provided in an at least partially hollow stem of a suction cup that is suitable for mounting to a surface of a transparent material across from said selected portion of said visual display to be held there by relative air pressure differences between front and back sides of said suction cup, said photodetector being set back from said surface of said suction cup that is against said surface of said transparent material by at least one-eighth inch.

5. The apparatus of claim 1 wherein said signal processor has a capacitor connected to said input thereof and a switch connected to said input thereof and to a controller, said switch also having a discharge resistor and a signal input of a magnitude comparator electrically connected thereto to thereby be capable of being directed to electrically connect said capacitor alternatively to said discharge resistor and to said comparator under direction of said controller, said comparator having also an output and an input so as to be capable of having an output signal on said output thereof in one logic state for a signal magnitude on said input thereof going beyond a threshold value and in an opposite logic state for a signal magnitude on said input thereof that fails to reach said threshold value.

6. The apparatus of claim 1 wherein said display device comprises a selected one of a television receiver and a display monitor.

7. The apparatus of claim 2 wherein said signal processor has a capacitor connected to said input thereof and a switch connected to said input thereof and to a controller, said switch also having a discharge resistor and a signal input of a magnitude comparator electrically connected thereto to thereby be capable of being directed to electrically connect said capacitor alternatively to said discharge resistor and to said comparator input under direction of said controller, said comparator having also an output so as to be capable of having an output signal on said output thereof in one logic state for a signal magnitude on said input thereof going beyond a threshold value and in an opposite logic state for a signal magnitude on said input failing to reach said threshold value.

8. The apparatus of claim 3 wherein said photoconductor is formed of cadmium sulfide.

9. The apparatus of claim 4 wherein said suction cup is substantially opaque to light passing therethrough.

10. The apparatus of claim 5 wherein said switch is directed by said controller to repeatedly connect said capacitor between said comparator input and said resistor following a transition from relatively more light to relatively less light at an ending of a light pulse until a transition from relatively less light to relatively more light is found to occur.

11. The apparatus of claim 5 wherein said switch is directed by said controller to repeatedly connect said capacitor between said comparator input and said resistor after a predetermined amount of time following a transition from relatively less light to relatively more light that begins a light pulse.

12. The apparatus of claim 5 wherein a digital counter is provided having an output and having a clock input, said digital counter being capable of counting pulses in clocking signals provided at said clock input thereof by said controller and terminating such counting as controlled by said controller.

13. The apparatus of claim 6 wherein said data source comprises a selected one of a broadcast station, a video tape player, a video disk player and a computer.

14. The apparatus of claim 7 wherein said switch is directed by said controller to repeatedly connect said capacitor between said comparator input and said resistor following a transition from relatively more light to relatively less light at an ending of a light pulse until a transition from relatively less light to relatively more light is found to occur, and wherein said switch is directed by said controller to repeatedly connect said capacitor between said comparator input and said resistor after a predetermined amount of time following a transition from relatively less light to relatively more light that begins a light pulse.

15. The apparatus of claim 10 wherein said switch is directed by said controller, in repeatedly connecting said capacitor between said comparator input and said resistor, to switch from connecting said capacitor to said comparator input to connecting said capacitor to said resistor following a signal on said comparator input going beyond said threshold value.

16. The apparatus of claim 11 wherein said switch is directed by said controller, in repeatedly connecting said capacitor between said comparator input and said resistor, to switch from connecting said capacitor to said comparator input to connecting said capacitor to said resistor following a signal on said comparator input going beyond said threshold value.

17. The apparatus of claim 12 wherein a digital accumulator is provided having an output and having an input electrically connected to said digital counter output to receive counts therefrom for summing and temporary storage of resulting sums in said digital accumulator.

18. The apparatus of claim 14 wherein that number of light pulses in a packet is counted following a start light pulse to determine if a complete packet of light pulses has been received.

19. The apparatus of claim 17 wherein said switch is directed by said controller at selected times to repeatedly connect said capacitor between said comparator input and said resistor with each connection to said comparator input being of sufficient duration to cause said comparator to change output states to thereby enable said digital counter to provide a count for each such duration having a value proportional to that duration which counts are summed in said digital accumulator to provide a corresponding accumulation of such counts, there being one such accumulation provided for each said selected time.

20. The apparatus of claim 19 wherein a digital comparator having a signal input is electrically connected to said digital accumulator output to compare said accumulation to a threshold value, said threshold value being determined from a fraction of an accumulation based on said optical transmitter providing light of a selected intensity.

21. An optical signal receiving system for coupling to an optical channel to receive therefrom optical signals provided as sequences of light pulses representing binary states, said system comprising:

a photodetector for coupling to said optical channel to receive said optical signals therefrom and provide at an output thereof corresponding electrical signals serving as photodetector output signals; and a signal processor having an input electrically connected to said photodetector output to receive said photodetector output signals, said signal processor being capable of initiating a sequence of repeated measurements of said photodetector output signal magnitude to thereby provide a corresponding sequence of magnitude representations which are summed to provide a corresponding accumulation of those said magnitude representations, including a calibration accumulation based on said optical signal being of a selected light intensity and bit detection accumulations based on optical intensities occurring in connection with said light pulses, said signal processor providing said calibration accumulation after a selected modification thereto as a threshold magnitude against which magnitudes of bit detection accumulations are compared in determining which binary states are represented by said light pulses.

22. The apparatus of claim 21 wherein said modification of said calibration accumulation is providing a fraction thereof resulting from addition of other fractions of said calibration accumulation.

23. A method for transmitting information by digital binary signaling over an optical channel, said system comprising:

transmitting an optical signal provided by a selected portion of a visual display in a display device, serving as an optical transmitter, which can selectively provide light to thereby provide sequences of light pulses in said channel as said optical signal with durations of said light pulses therein representing binary logic states in accord with digital data provided to said optical transmitter by a data source to thereby form a binary pulse duration modulated optical signal in said channel, said light pulses in said sequences of said optical signal each having a minimum duration after their beginning;

converting said optical signal to a corresponding electrical signal in a photodetector positioned across from said selected portion of said visual display to receive said optical signal from said channel, including converting first and second portions of said optical signal, representing corresponding first and second datums from said data source, to first and second portions of said electrical signal, said electrical signal and first and second portions thereof serving as a photodetector output signal and portions thereof;

acquiring said photodetector output signal first portion in a signal processor capable of determining substantially when individual ones of said light pulses began and ended relative to neighboring said light pulses in said sequences thereof; and evaluating said photodetector output signal first portion with a processor signal representing a third datum to determine whether a selected relationship is present between said first datum and said third datum if said processor signal, acquired from a source other than said photodetector, is presented for such evaluation within a selected time duration of said acquiring of said photodetector output signal first portion and before any acquiring of said photodetector output signal second portion.

24. The method of claim 23 wherein a fourth datum is subsequently represented by another processor signal acquired from a source other than said photodetector before any acquiring of said photodetector output signal second portion, and further comprising evaluating said photodetector output signal first portion with said other processor signal representing said fourth datum to determine whether a selected relationship is present between said first datum and said fourth datum.

25. The method of claim 23 wherein said processor signal representing a third datum is acquired from a timer.

26. The method of claim 24 where in said other processor signal representing said fourth datum is acquired from a timer.

27. The method of claim 24 wherein said evaluating of said photodetector output signal first portion with said other process or signal representing said fourth datum occurs even if said evaluating of said photodetector output signal first portion with said processor signal representing said third datum does not occur because said processor signal representing said third datum is not presented within a selected time duration of acquiring said photodetector output first signal portion and before acquiring of said photodetector signal output portion.

28. The method of claim 26 wherein said processor signal representing said third datum is acquired from a further timer.

* * * * *